Feb. 20, 1962 G. WALLACH 3,021,671
ROCKET ENGINES
Filed April 3, 1958
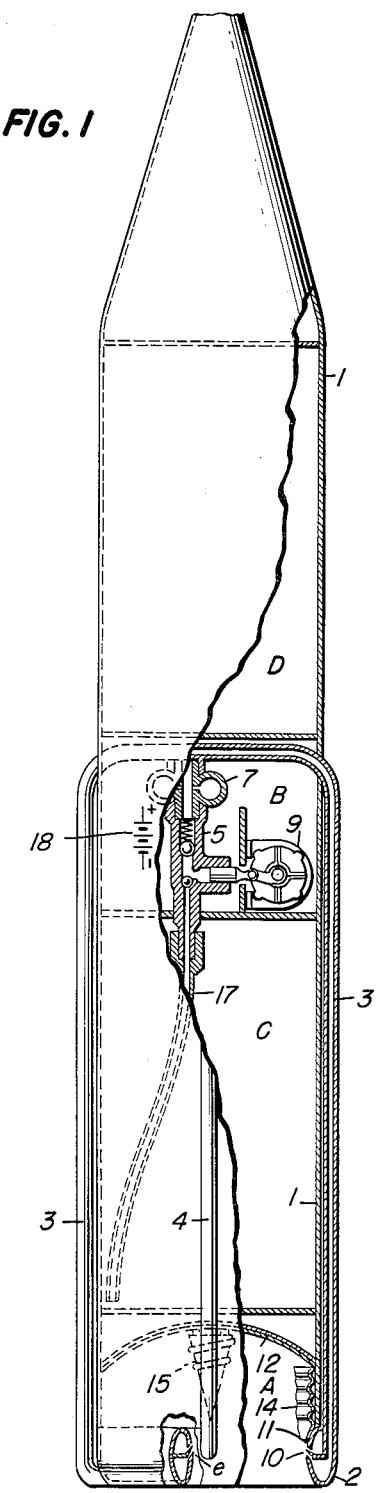
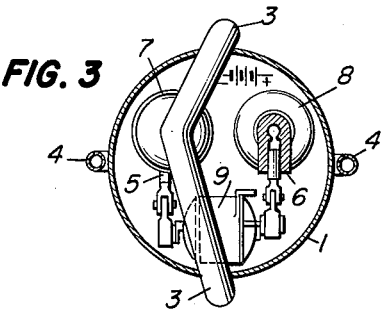
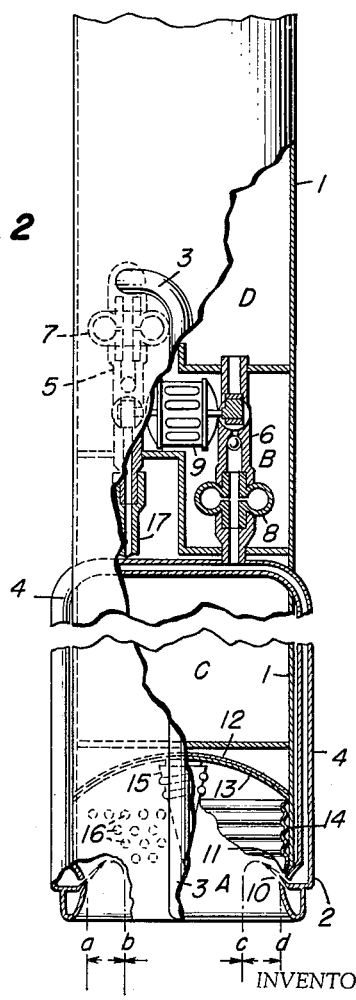
INVENTOR.
George Wallach
BY
*Gustav Miller*
ATTORNEY

3,021,671
ROCKET ENGINES
George Wallach, Chapman Camp, British Columbia, Canada (12565 24th Ave., R.R. 3, White Rock, British Columbia, Canada)
Filed Apr. 3, 1958, Ser. No. 726,272
1 Claim. (Cl. 60—35.6)

This invention relates to a rocket engine, consisting in principle of a combustion chamber which is rear to front charged, an appliance chamber containing an electric motor, two high-pressure reciprocal pumps, two air-traps and an electric battery or batteries; further it consists of a liquid fuel and oxidizer compartment, such liquid fuel and oxidizer compartments being interconnected with the rear of the combustion chamber by means of suitable ducts, and such ducts interposed with appropriate artifices such as a reciprocal pump and an airtrap.

It is the primary object of this invention to provide an economy combustion chamber, a combustion chamber whose rear extremity forms the nozzle, the said combustion chamber-nozzle due to its expedient structure and contingent operation reduce fuel and oxidizer consumption to about half without reducing the power output or thrust of such rocket engine. This objective is realized by charging the combustion chamber from the rear-most end of its nozzle, and directing the jet effect toward the front or inside of such combustion chamber, from an annular two-compartment tubular spray ring provided with a circular, slot-like double orifice.

It is further the object of this invention to provide for a high pressure feeding system to above said annular double orifice, the degree of such high pressure feeding being directly responsible for such rocket engine's high efficiency.

This invention further relates to a combination of parts which will be hereinafter described and more particularly pointed out in the appended claim.

In order to make this invention to be more readily understood, reference is made to the accompanying drawings which illustrate the embodiment thereof in four different views, and of which:

FIG. 1 is a partial sectional side elevation view of the counter jet rocket engine.

FIG. 2 is an abridged, partially sectional elevation view of FIG. 1.

FIG. 3 represents a partially sectional front view of the rocket engine's appliance chamber B; and FIG. 4 depicts a cross sectional view of the three segmentary parts the annular two-compartment spray ring may preferably be welded of together.

In conformation with FIG. 1 and FIG. 2 the cylindrical, stubby shaped combustion chamber A, whose rear end is utilized as the jet nozzle; is framed at its inside periphery with the two-compartment spray ring 2, the cross sectional shape of this spray ring is portrayed at (e) and in FIG. 4; above said spray ring 2 being strategically placed at the exhaust end of such combustion chamber forming the jet nozzle.

Spray ring 2 is permanently attached to the cylindrical rocket engine wall 1, and is connected with oxygen compartment C and liquid fuel compartment D by means of ducts 3 and 4 respectively, interposed with high pressure reciprocal pumps 5 and 6, and airtraps 7 and 8, one for fuel and the other for oxidizer. Whilst air-traps retain the compressed air inside irrespective of position or incline of the rocket engine, the resilient air serves to smoothen out the rhythmical impulses of the reciprocal pumps and deliver fuel and oxidizing agents to spray ring 2 with a steady, uniform pressure. High pressure reciprocal pumps 5 and 6 are activated by electric motor 9, by means of eccentrics mounted on each end of the motor drive shaft; such motor and high pressure pumps, single or double acting as the occasion may require, to be constructed along known technical lines used where high pressure pumping is required.

Along the entire circumference of spray ring 2 extended orifices 10 and 11 are located in a forward, and tangentially somewhat to the inward position of said spray ring 2, and direct through such orifices under heavy pressure emitted streams of fuel and oxidizer toward the thrust wall 12 of combustion chamber A. Few degrees variation in the tangential position of slotted orifices 10 and 11 one to another permits the two narrow streams of fuel and oxidizer to cut through one another, this vexing of fluid substance during the process of combustion results in a concentrated burning up and is a contributing factor to the efficiency of this rocket engine.

Such concentrated combustion follows the most strategical sequel of this invention as follows:

The under heavy pressure emitted jet of liquid fuel and oxidizer, augmented by the consequent explosive expansion in the process of combustion, will effect an intense thrust on thrust wall 12. To gain exit however, those burned and burning gases must reverse its course and as indicated by arrows b and c in FIG. 2 return to rearward. As the outer half of the jet nozzle area is taken up by the inward streaming and combustion-expanding gases, the exit of the outward flowing gases is limited to the center half of the jet nozzle. Therefore; it is particularly noteworthy here that owing to this partial fluidal obstruction only half of the combustion material is needed to maintain any given thrust pressure in the combustion chamber, and the jet engine's efficiency is stepped up one hundred percent. This doubled efficiency can also be interpreted in terms of doubling the range possibility for any given amount of combustible material.

Another contributing factor of appreciable advantage to this invention is the constant full efficiency of the jet thrust, irrespective of the launching speed of the rocket engine. Whereas a reaction engine at high speed tends to run away from the expansion effect of the jet gases, the forward pointed, slotted orifices 10 and 11 in spray ring 2 make the ensuing combustion agents to follow steadfastly the forward speeding jet engine, and are thus in position, due to an equal inertia factor with the rocket engine, to maintain their functional efficiency at any speed.

Further essential features pertinent to this invention are: The cylindrical, corrugated thrust wall 14 gives the combustion chamber A the necessary strength, barring undue weight, and owing to the successively ringed irregularities contributes to the thorough compounding and efficient burning up of the combustible material. Heat insulation 13 prevents an excessive heating of thrust wall 12, electrical heating element 15 initiates and safeguards the continuation of combustion. The two-series perforations 16 extend around the entire circumference of rocket engine wall 1 and remove excessive lateral heat from cylindrical corrugated wall 14, the flexible suction hose 17 affords direct contact with liquid oxygen irrespective of position or inclination of the rocket engine, and electric battery 18 supplies electrical energy to motor 9, and heating element 15.

Having thus described the invention and the advantages thereof, it will be understood that the invention is not to be limited to the details herein disclosed, otherwise than as set forth in the claim, but that what is claimed is:

The counter-jet liquid fuel rocket engine including a fuel chamber, an oxidizer chamber, and an engine appliance chamber, said three chambers being contained in the portion of a cylindrical rocket engine wall forward of the rear end thereof, and a combustion chamber located in said rear end behind said three chambers, a two-compartment hollow ring located closely adjacent the rear cylindrical edge of said cylindrical engine wall at the rear of said combustion chamber, a domed ceiling wall separating said combustion chamber from said three forward chambers, a first connecting duct for supplying fuel from said fuel chamber to one of said compartments in said two-compartment ring, a second connecting duct for supplying oxidizer from said oxidizer chamber to the other compartment in said two-compartment ring, said two-compartment ring comprising a hollow ring and an intermediate dividing wall therein, each ring compartment being provided with a narrow circumferentially elongated slit closely adjacent said dividing wall and each slit being angled very slightly toward the other and directed generally toward said domed ceiling wall in the direction of flight whereby fuel and oxidizer ignite while emitted toward each other in the direction of flight toward said dome ceiling and react thereagainst and then eject rearwardly centrally of said hollow ring.

References Cited in the file of this patent

UNITED STATES PATENTS

| | | |
|---|---|---|
| 1,777,891 | Pearson | Oct. 7, 1930 |
| 1,809,394 | Schweisthal | June 9, 1931 |
| 2,465,525 | Goddard | Mar. 29, 1949 |
| 2,476,185 | Goddard | July 12, 1949 |
| 2,609,658 | Goddard | Sept. 9, 1952 |
| 2,633,700 | Goddard | Apr. 7, 1953 |
| 2,633,706 | Goddard | Apr. 7, 1953 |
| 2,709,887 | Goddard | June 7, 1955 |
| 2,835,106 | Carter | May 20, 1958 |
| 2,883,829 | Africano | Apr. 28, 1959 |

OTHER REFERENCES

Publication: Flight, vol. 72, No. 2538, Sept. 13, 1957, page 444.

Publication: Astronautics, March 1936, pages 12, 13 and 18 relied on.